(12) United States Patent
Ashkin et al.

(10) Patent No.: US 7,803,732 B1
(45) Date of Patent: Sep. 28, 2010

(54) COMPOSITIONS FOR IMPROVED CERAMIC ARMOR

(75) Inventors: Daniel Ashkin, San Marcos, CA (US); Richard Palicka, San Clemente, CA (US)

(73) Assignee: BAE Systems Advanced Ceramics, Inc.

( * ) Notice: Subject to any disclaimer, the term of this patent is extended or adjusted under 35 U.S.C. 154(b) by 0 days.

(21) Appl. No.: 11/430,013

(22) Filed: May 9, 2006

(51) Int. Cl.
*C04B 35/577* (2006.01)
*F41H 5/00* (2006.01)

(52) U.S. Cl. .................. 501/91; 501/92; 501/98.4; 501/98.6; 89/36.02

(58) Field of Classification Search .......... 501/88, 501/91, 92, 96.5, 98.4, 98.6; 89/36.02
See application file for complete search history.

(56) References Cited

U.S. PATENT DOCUMENTS

| | | | | | |
|---|---|---|---|---|---|
| 5,082,597 | A | * | 1/1992 | Tashiro et al. | 252/516 |
| 5,108,965 | A | * | 4/1992 | Tani et al. | 501/92 |
| 5,298,470 | A | * | 3/1994 | Chia et al. | 501/89 |
| 5,354,536 | A | * | 10/1994 | Ezis | 419/48 |
| 5,470,806 | A | * | 11/1995 | Krstic et al. | 501/90 |

FOREIGN PATENT DOCUMENTS

| | | | |
|---|---|---|---|
| JP | 60-246266 | * | 12/1985 |
| JP | 61286265 | * | 12/1986 |
| JP | 63-185862 | * | 8/1988 |

OTHER PUBLICATIONS

Certified translation of JP 60246266, Dec. 5, 1985.*

* cited by examiner

*Primary Examiner*—Karl E Group
(74) *Attorney, Agent, or Firm*—H. Jay Spiegel

(57) ABSTRACT

The present invention contemplates the addition of zirconium compounds to well known ceramic ballistic materials to increase resistance to penetration by projectiles. In the preferred embodiments of the present invention, the zirconium compound that is employed consists of $ZrO_2$ and is provided in the range of about 0.1% to about 11%, by weight, of starting material before densification. Preferred ranges of proportion of $ZrO_2$ in the finished ceramic material are in the ranges of about 0.30% to about 0.75%, by weight, or about 8-9%, by weight. The ballistic material using the combination of SiC with low volume of sintering aid and $ZrO_2$ raises the theoretical density of the ceramic material to between 3.225 and 3.40 g/cc, which is slightly higher than the typical 3.22 g/cc theoretical density for hot pressed fully dense SiC. The unexpected result that accrues through combining silicon carbide and zirconia consists of the creation of controlled defects in the finished ceramic that increase the surface area that is fractured during a ballistic event, enhancing spreading of the forces imposed on the ceramic material by a projectile and, as a result, the ability of the ballistic material to withstand higher forces while resisting penetration.

17 Claims, 5 Drawing Sheets

COMPOSITIONS FOR IMPROVED CERAMIC ARMOR

BACKGROUND OF THE INVENTION

The present invention relates to compositions for improved ceramic armor. Dense silicon carbide ceramics have been shown to be an effective means to protect against a wide variety of ballistic threats because of their combination of high hardness, strength and stiffness with low bulk density and favorable pulverization characteristics upon impact. Dense silicon carbide is typically produced using the following method steps:

1. Mixing fine silicon carbide powders with a sintering aid.
2. Drying the powder and if necessary adding processing aids to it.
3. Green forming the powders into a shape so that individual powder grains are in close contact with each other and the shape is retained after forming. Common forming techniques are slip casting, dry pressing, and extrusion.
4. Removing the processing aids such as binders by heat treatment.
5. Densification of the ceramic part by sintering, hot pressing, hot isostatic pressing (HIP) or sinter+HIP in a controlled atmosphere.

Silicon carbide is a covalently bonded ceramic having low self-diffusion coefficients. To increase diffusion and facilitate densification, sintering aids are added in amounts generally less than 5 volume percent. For silicon carbide, the first additive used for densification was $Al_2O_3$ and the method for densification was hot pressing. This was developed in the 1950s as reported by the Journal of the American Ceramic Society, Volume 39, pp. 386-89 (1956) in the article by Alliegro et al. titled "Pressure-Sintered Silicon Carbide." Effective use of $Al_2O_3$ was also reported by the Journal of Material Science, Vol. 10, pp. 314-320 in the article by F. F. Lange titled "Hot-Pressing Behavior of SiC Powders with Additions of Alumina," and was shown by Lange to be due to liquid phase sintering. In 1970s and 1980s, pressureless sintering was developed by using compounds based on elements such as Boron (B), (S. Prochazka, "The Role of Boron and Carbon in Sintering of Silicon Carbide," *Special Ceramics, Vol. 6*, edited by P. Popper, Stoke-On-Trent, England, 1975, pp. 171-181), Carbon (C), Beryllium (Be), (U.S. Pat. No. 4,172,109), and Aluminum (Al), (D. H. Stutz, S. Prochazka, J. Lorenz, "Sintering and Microstructure Formation of Beta-SiC," J. Am. Ceram. Soc., 68[9], 479-82, (1985). These additives were added for the purpose of promoting solid-state diffusion. Carbon was added for the purpose of cleaning off the $SiO_2$ layer from the silicon carbide surfaces and allowing the surfaces to be activated by B, Be and Al.

In the 1980s and 1990s, work was done on liquid phase sintering of SiC using rare earth oxide additives. This was disclosed in U.S. Pat. Nos. 4,564,490 and 4,569,921 and in an article by L. Cordrey, et al. titled "Sintering of Silicon Carbide with Rare-Earth Oxide Additions," in Sintering of Advanced Ceramics, v. 7, (1990), pg. 618, edited by C. A. Handwerker, et al. For these materials, the diffusion occurs through the liquid phase instead of through the solid phase. For successful liquid phase sintering, Negita stated that free energy of formation for the metal oxide additives must be more negative than free energy of oxidation for silicon carbide at sintering temperatures. See K. Negita, "Effective Sintering Aids for Silicon Carbide Ceramics: Reactivities of Silicon Carbide with Various Additives," J. Am. Ceram. Soc., 69[12], C-308¥C-310, (1986). By using oxide additives that meet this criterion, the oxide additives remain stable and do not result in oxidation and decomposition of the silicon carbide. Oxidation and decomposition of the silicon carbide, besides resulting in lost material, produces gas species that can inhibit sintering. Shown below are the reactions for silicon carbide decomposition along with the temperature in which they have the lowest free energy. It is seen that reaction products change with temperature.

| | |
|---|---|
| 1) $SiC + O_2 \rightarrow SiO_2 (s, l) + C$ | (300 ¥ 1800° C.) |
| 2) $\tfrac{2}{3}SiC + O_2 \rightarrow \tfrac{2}{3}SiO_2 (s, l) + \tfrac{2}{3}CO$ | (1800 ¥ 2075° C.) |
| 3) $SiC + O_2 \rightarrow SiO (g) + CO$ | (2075 ¥ 2100° C.) |
| 4) $2SiC + O_2 \rightarrow 2Si (s, l) + 2CO$ | (2100 ¥ 2600° C.) |

The free energy versus temperature is shown in FIG. 1. FIG. 2 shows the free energy of formation for rare earth oxides in comparison to reaction c from 1800-2600° K. Rare earth oxides it is seen are stable versus silicon carbide. As such, much emphasis was placed on the sintering behavior of these materials in the 1990s.

In early 1990s, Andre Ezis at BAE Systems Advanced Ceramics showed that the choice of sintering additive was important in determining ballistic performance. See U.S. Pat. No. 5,354,536. The use of AlN as a sintering additive was shown to result in clean grain boundaries even in grades of SiC with metal impurities and the optimum amount of sintering additive was found to be a function of the surface area. The fracture of these materials was intergranular. The superior ballistic performance of these materials suggests the importance of fracture mechanism and microstructure in determining ballistic behavior. It should be noted that the ballistic event involves significant pulverization of the ceramic. The pulverization characteristics of ceramics, in which a significant mass of material is comminuted into fine particles underneath the projectile, have not been related to static mechanical properties. Static mechanical properties when applied to ballistic properties have generally been applied to cracks forming near the surface of the ceramic during impact.

In SiC for static applications, second phase additions have been added to improve toughness. Specifically, M. Janney, "Mechanical Properties and Oxidation Behavior of a Hot-Pressed SiC-15 vol %-$TiB_2$ Composite," Ceramic Bulletin, Vol. 66[2], 322-324, (1987), determined an increase in toughness from 3.1 to 4.3 MPa m ½ with 15 volume percent $TiB_2$ additive (20 weight percent) and G. C. Wei and P. Becher, "Improvement in Mechanical Properties in SiC by Addition of TiC Particles," Journal American Ceramic Society, 67[8] 571-74 (1984), determined an increase in fracture toughness for different volume percent TiC additive. These carbides and borides are stable versus SiC at high temperatures and have been shown to toughen the material by crack deflection.

In further work, V. D. Krstic and M. Vlajic, U.S. Pat. No. 5,470,806, patented a powder bed technology to liquid phase sinter SiC with transition metal oxide additives for the purpose of fusing the oxides and converting them into carbides during the course of sintering. The powder bed surrounding the part contained silicon carbide, aluminum oxide and carbon and facilitated the conversion to carbides in the sintered body and prevented excessive weight loss during sintering. The part and the powder bed were contained in a sealed graphite crucible. Aluminum oxide was used as the sintering additive to promote rapid densification and minimize reaction times. For an SiC composition containing 6.5 wt. % $Al_2O_3$, 2.5 wt. % $TiO_2$, 6.0 wt. % $ZrO_2$ and 2.0 wt. % C, a fracture toughness of 6.3 Mpa m ½ could be achieved while for an SiC composition containing 8.7 wt. % $Al_2O_3$, 20.0 wt. % $TiO_2$, 6.3 wt. % $ZrO_2$ and 5.0 wt. % C, a fracture toughness of 7.2 MPa m ½ could be achieved. In these materials, the $TiO_2$ and $ZrO_2$ reacted to TiC and ZrC during sintering. Typical sintered SiC has a fracture toughness of 4.0 to 5.0 MPa m ½.

In an effort to increase the ballistic performance of SiC, Applicants have looked at oxide additives that do not meet Negita's criterion for use as sintering aid and result in carbide formation below or at sintering temperatures. Oxide additives that do not meet Negita's criterion cause the decomposition of SiC by either simultaneous formation of metal carbide, silicon and CO or simultaneous formation of silicon, metal and CO. The generalized equations are shown below.

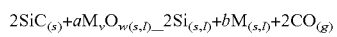

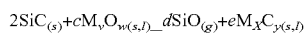

In the present invention, $ZrO_2$ additions are added which will result in decomposition of the SiC and formation of ZrC, and some combination of Si, SiO and CO. The present invention demonstrates that $ZrO_2$ can be used to increase ballistic performance of silicon carbide when added in small amounts and using a furnace design in which the atmosphere can be controlled. Both $ZrO_2$ and stabilized $ZrO_2$ such as 3 mole percent $Y_2O_3$ stabilized $ZrO_2$ (3TZY) can be used.

Along with decomposition of SiC and $ZrO_2$ during sintering of SiC, volatization reactions involving the $SiO_2$ (native silica on the SiC grain) and $ZrO_2$ to SiO, ZrO, and $O_2$ would be expected in SiC ceramics. The vapor pressure of these species depends on temperature, the amount of $SiO_2$, $ZrO_2$, free carbon, other phases and kinetic considerations. The presence of these species however would not affect the direction of the high temperature decomposition reactions at sintering temperatures of SiC in inert gas or vacuum furnaces.

SUMMARY OF THE INVENTION

The present invention relates to compositions for improved ceramic armor. The present invention includes the following objects, aspects and features:

(1) In a first aspect, the present invention contemplates the addition of zirconium compounds to well known ceramic ballistic materials to increase resistance to penetration by projectiles.

(2) In an effort to increase the ballistic performance of SiC, Applicants have looked at hot press technology and oxide additives that would decompose SiC and form stable carbides to improve performance. These SiC mixtures were loaded into a graphite hot press die and no powder bed was used. The silicon carbide material is sintered with aluminum nitride as the sintering aid as recited in original dependent claim 3. The compositions with improved performance included those with trace amounts of oxides generally not considered sufficient for purposes of toughening the materials. The trace quantities could be added by various means including the use of attrition during ball milling. For the case of the transition metal oxide, zirconium oxide, zirconia ($ZrO_2$) and yttria stabilized zirconia milling media, could be used. Other elements with oxides that meet the condition of decomposing SiC and forming stable carbides without forming silicides are Ti, V, Nb, Cr, Mo, and W. In addition, metals of these compounds can be used as reactants for carbide formation as well as carbonates, nitrates, etc. that form oxides at elevated temperatures.

(3) In the preferred embodiments of the present invention, the zirconium compound that is employed consists of $ZrO_2$ and is provided in the range of 0.1% to 11%, by weight, to the starting ceramic powder. Preferred ranges of proportion of $ZrO_2$ in the powder are in the ranges of about 0.30% to about 0.75%, by weight, and about 8% to about 9%, by weight and react to zirconium carbide during hot pressing.

(4) Applicants have found that creation of a ballistic material using the combination of SiC—N and $ZrO_2$ starting powders raises the density of the ceramic material to about 3.23 to 3.40 g/cc, slightly higher than the theoretical density of SiC—N, 3.22 g/cc. SiC—N is a BAE Systems Advanced Ceramics (formerly Cercom) product based on U.S. Pat. No. 5,354,536.

(5) The unexpected result that accrues through combining silicon carbide ceramics and zirconia consists of the creation of controlled defects in the microstructure of the finished ceramic that increases the fracture surface energy during a ballistic event. These defects result in enhanced spreading of the forces imposed on the ceramic material by a projectile and, as a result, the ability of the ballistic material to withstand higher forces while resisting penetration.

As such, it is a first object of the present invention to provide compositions for improved ceramic armor.

It is a further object of the present invention to provide such a ballistic material in which a powder made up of a zirconium compound is intermixed with a compound including silicon carbide in a desired proportion.

It is a still further object of the present invention to provide such a ballistic material that has controlled defects in its microstructure that enhance resistance to projectile penetration.

These and other objects, aspects and features of the present invention will be better understood from the following detailed description of the preferred embodiments when read in conjunction with the appended drawing figures.

SPECIFIC DESCRIPTION OF THE PREFERRED EMBODIMENTS

To improve the performance of Silicon Carbide for ballistic applications, Applicants produced composites from starting composition SiC+sintering additive+$ZrO_2$ that reacts to SiC+ZrC. $ZrO_2$ is one of several metal or transition metal oxides that form stable carbides when reacted with SiC at high temperatures. ZrC has moderate strength, high hardness, and high toughness. ZrC, though not used as a ballistic material, because of high density and cost, shares some of the characteristics of an armor material in showing good strength with high hardness. In limited studies, $ZrO_2/ZrC$ has been added to SiC in amounts of greater than 5 wt. % for the purposes of toughening. It should be noted that the reaction of ZrO2 to ZrC reduces the molecular weight of the zirconium containing compound from 123.2 g to 103.2 g and the molar volume from 22 cc to 15.3 cc. As such, this reaction has the effect of reducing the weight and volume percent of zirconium containing compound.

Figure 1:
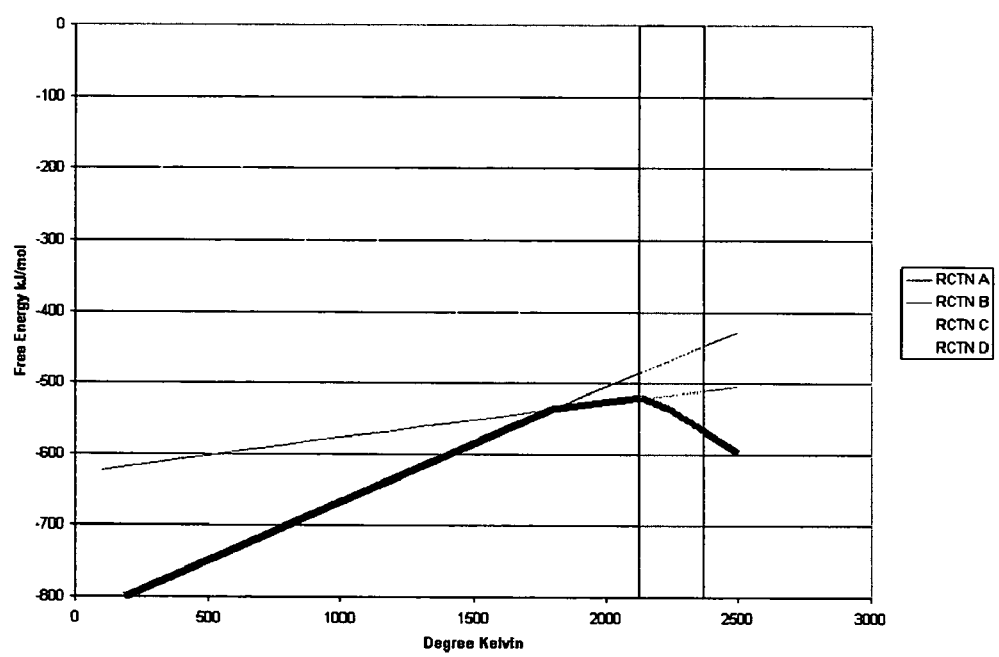
FIG. 1 shows a graph of temperature dependence of the standard free energies for the oxidation reaction of silicon carbide.
Figure 2:
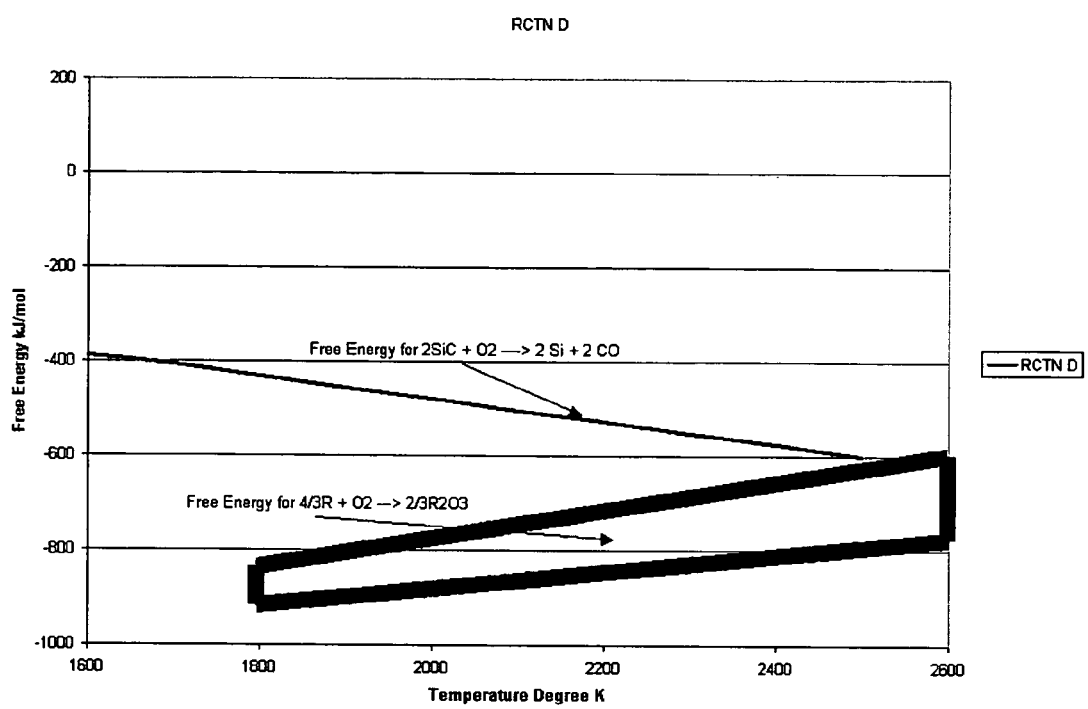
FIG. 2 shows a graph of the formation of rare earth oxides as compared to reactions "d" from FIG. 1, from 1800-2600 degrees K.
Figure 3:
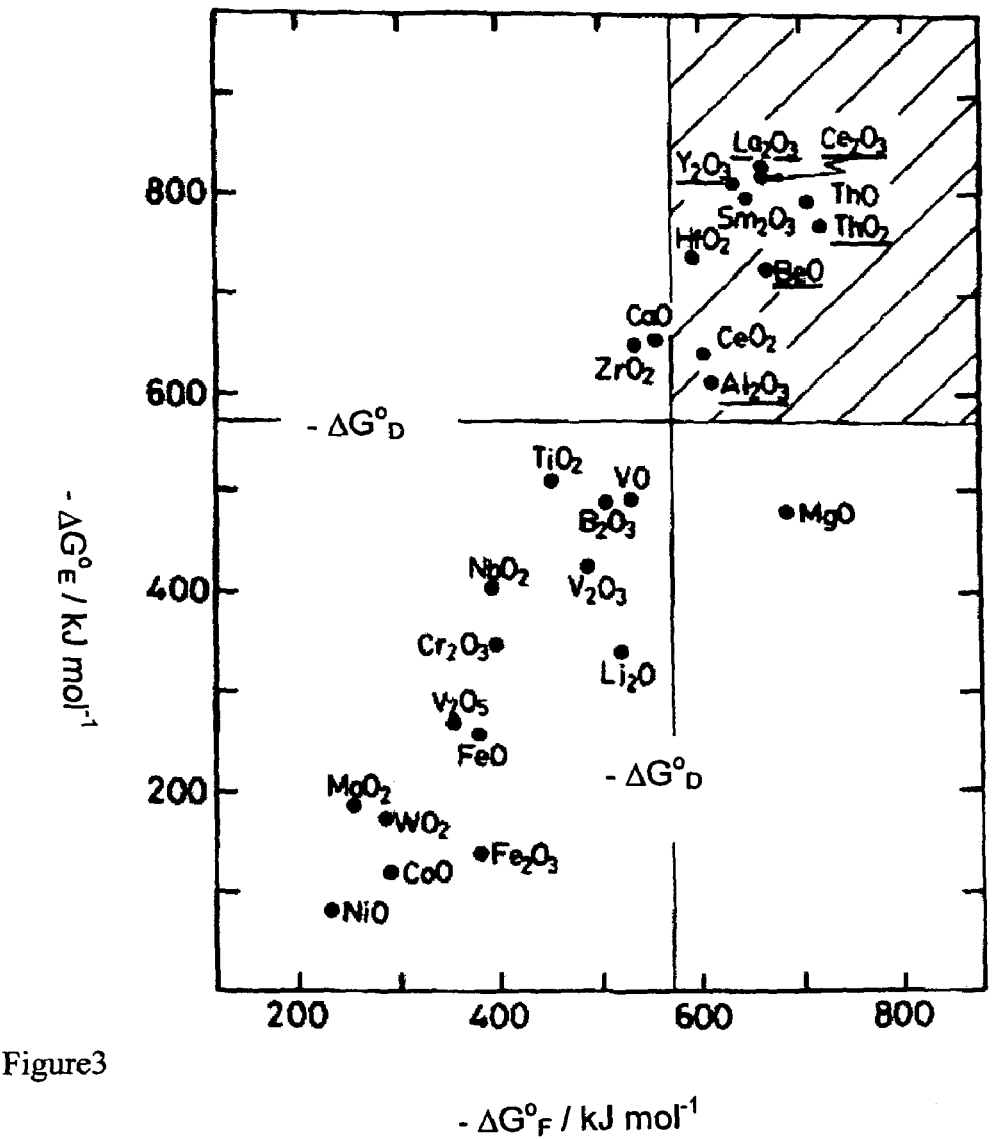
FIG. 3 shows a graph from Negita (1986) of oxides that do not decompose SiC at temperatures of 2400° K. (hatched area).

In this work, it has been found that small additions, less than 1 wt. % of $ZrO_2$ to the starting powder can, in fact, be beneficial for use in silicon carbide dwell armor. In dwell armor, the ceramic is put into compression and remains intact as a long rod tungsten projectile strikes the surface of the ceramic at velocities up to or exceeding 1500 m/sec. See P. Lundberg, R. Renstrom, L. Holmberg, "Impact of metallic projectiles on ceramic targets: transition between interface defeat and penetration," Int. J. Impact Engng., 24, 259-75, (2000). After the period of dwell in which the projectile is ablated, it has been shown that the ceramic cracks and then becomes comminuted. See D. A. Shockey, A. H. Marchand, S. R. Skaggs, G. E. Cort, M. W. Burkett and R. Parker, "Failure Phenomology of Confined Ceramic Targets and Impacting Rods," *Ceramic Armor Materials by Design*, edited by J. W. McCauley et al., (The American Ceramic Society, Westerville, Ohio 2002), pp. 385-402. The nature of this comminuted zone is not well understood but ballistic tests have suggested that the fracture behavior of the grains and grain boundaries are of utmost importance. With this in mind, Applicants have introduced small additions of $ZrO_2$ to influence the fracture behavior of the grains and grain boundaries. It was found by Applicants that $ZrO_2$ additions, though not thermodynamically stable as shown in FIG. 3, have a favorable effect on the ballistic performance of SiC. These additives react to ZrC and likely cause the decomposition of SiC to Si or SiO. This decomposition reaction along with the residual stresses from the thermal expansin mismatch between the SiC and ZrC leads to a weakened grain boundary phase that acts as a controlled defect. Since ZrC has a higher thermal expansion than SiC, $7 \times 10^{-6}$ versus $4.5 \times 10^{-6}$, the stresses on the grain boundary are tensile. This means that upon pulverization during a ballistic event, localized cracking occurs along these grain boundaries. This cracking of the stressed and weakened grain boundaries acts as an energy absorber as a result of a controlled defect. For the purpose of having a weak grain boundary phase, it is advantageous that the free energy of the decomposition reactions for $ZrO_2$ is only slightly less negative than that of the oxidation reactions for silicon carbide. This implies that the reaction of $ZrO_2$ to ZrC occurs at near the final sintering temperature of the SiC and defects from these decomposition reactions are preserved in the microstructure. EDS analysis has shown some residual oxygen (1-6%) in the zirconium carbide after hot pressing, suggesting that reaction is still progressing during final heat treatment. As such, compared to the other oxides outside the hatched area in FIG. 3 that likely decompose SiC and form carbides at lower temperatures, zirconium oxide is most preferable. However other oxides that react more easily to carbides will also have some beneficial effects on the ballistics of the SiC, both from a weakened grain boundary and residual stress. The metals in FIG. 3 that have associated oxides that form stable carbides at the sintering/hot pressing temperature of SiC are Ti, V, Nb, Cr, W, and Mo. Oxides of these metals could be substituted for zirconium oxide.

The regions outside the hatched area will react with SiC and decompose it. The y-axis of the plot correspond to the standard free energy of formation for the reaction

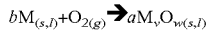

The x-axis of the plot correspond to the standard free energy of formation for the reaction

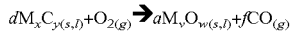

The horizontal and vertical lines correspond to reaction

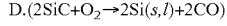

The thermal expansion of carbides associated with these metals is similar to that of ZrC. The thermal expansions of carbides for Mo, V, Nb, and Ti are between 7 and $8.5 \times 10^{-6}$ in/in ° C. while $Cr_3C_2$ has a thermal expansion of $11.5 \times 10^{-6}$ in/in ° C. As noted, silicon carbide has a thermal expansion of $4.5 \times 10^{-6}$ in/in ° C. and the effect of these differences in thermal expansion between SiC and carbides formed from oxides such as zirconia is residual stresses and/or microcracking that preferentially cause intergranular fracture during a ballistic event. Intergranular fracture has been shown by Ezis to be an important feature for ballistic grade SiC and it is significant that these additions do not affect the grain boundary chemistry in ballistic grade SiC and change the mode of fracture. Instead, the formed carbides appear to act as a supplement that effects crack propagation through the mass of SiC grains during comminution. It should be noted that the improvement in ballistic performance from zirconium carbide particles can not be related to a simple improvement in fracture toughness from $2^{nd}$ phase particles since $2^{nd}$ phase particles generally only have a toughening effect when used in excess of 5 volume percent. It should also be noted that a partial reaction of the oxide to carbide has minimal effect on residual stresses of these materials due to the oxides high thermal expansion. $ZrO_2$ has a thermal expansion of $12 \times 10^{-6}$ in/in ° C. while $TiO_2$ has a thermal expansion between 7 and $10 \times 10^{-6}$ in/in ° C. The other oxides associated with the metal have, similarly, a higher thermal expansion than SiC.

Figure 4:
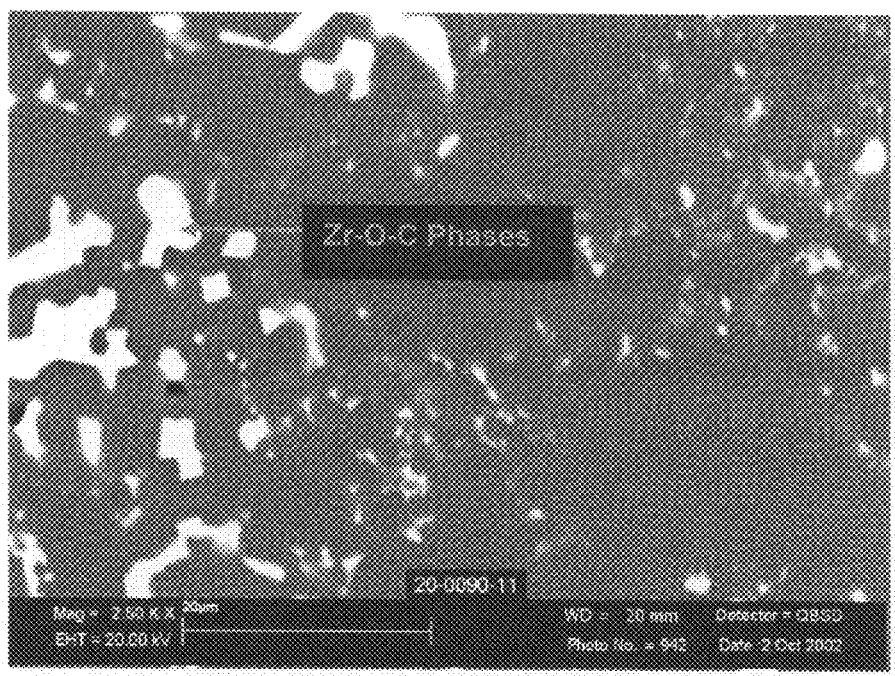
FIG. 4 comprises an SEM photomicrograph, backscatter electron image, of the fracture surface of a PAD SiC—N with 0.75%, by weight, starting $ZrO_2$ powder. The $ZrO_2$ in this material has reacted to zirconium carbide.

In a first example, $ZrO_2$ was added to BAE Systems SiC—N powder by use of Yttria Stabilized Zirconia Grinding Media (TZ-3Y) during ball milling in polypropylene jar. By measuring the attrition of the grinding media, the amount added was found to be 0.72 weight % zirconia. This zirconia, because it is from the wear of milling media, is fine grained in size and well dispersed through the powder. After milling the powder and sintering additive, the powder was dried and sieved as typical powder by BAE Systems Advanced Ceramics PAD SiC—N processing. The material was then hot pressed using typical BAE Systems Advanced Ceramics PAD SiC—N cycle. The material after hot pressing was machined and tested. The density of the hot pressed parts was 3.235 g/cc, which is greater than PAD SiC—N, which has a theoretical density of 3.22 g/cc. The increase in density is due to the addition of zirconia and/or zirconium compounds. As seen in FIG. 4, the microstructure shows that the zirconium compounds, bright particles, are evenly distributed and are fine grained (0.2 to 2 microns). XRD and EDS/SEM analysis indicated that bright particles were zirconium carbide indicating reaction of the starting zirconium oxide grains with silicon carbide to zirconium carbide. The average grain size of the final product was similar to PAD SiC—N, 3-5 microns.

The produced material with 0.72% zirconia starting additive was shown by Army Research Laboratories to have better ballistic performance than BAE Systems Advanced Ceramics PAD SiC—N for both seam shots and center shots. At a thickness of 0.75", tiles made with zirconia additions could not be penetrated by threat typically used to penetrate PAD SiC—N. This is despite the projectile being tested at a higher velocity (maximum velocity). Tiles made at 0.5" thick had an improved $v_{50}$ compared to PAD SiC—N.

In a second example, $ZrO_2$ was added to BAE Systems Advanced Ceramics PAD SiC SC-1R powder by using Yttria Stabilized Zirconia Grinding Media (TZ-3Y) during ball milling. By measuring the attrition of the grinding media, the amount added was found to be 0.75 weight % zirconia. This zirconia, because it is from the wear of milling media, is on average 0.2 to 2 microns in size and well dispersed through the powder. After milling the powder and sintering additive, the powder was dried and sieved as typical powder by BAE Systems Advanced Ceramics PAD SiC SC-1R processing. The material was then hot pressed using typical BAE Systems Advanced Ceramics PAD SiC SC-1R cycle. The material after hot pressing was machined and tested. The density of the hot pressed parts was 3.235 g/cc, which is greater than PAD SC-1R, which has a theoretical density of 3.22 g/cc. The increase in density is due to the addition of zirconia that reacts to zirconium carbide. PAD SiC SC-1R has an average grain size of 1.5 microns.

The produced material with 0.75% zirconia was shown by Army Research Laboratories to have better ballistic performance than BAE Systems Advanced Ceramics PAD SiC—N and BAE Systems Advanced Ceramics PAD SC-1R. At a thickness of 0.75", tiles made with zirconia could not be penetrated by a threat typically used to penetrate BAE Systems Advanced Ceramics PAD SiC—N. This was the case despite the projectile being tested at a higher velocity (maximum velocity).

In a third example $ZrO_2$ was added to BAE Systems Advanced Ceramics SiC—N powder by use of Yttria Stabilized Zirconia Grinding Media (TZ-3Y) during ball milling in polypropylene jar. By measuring the attrition of the grinding media, the amount added was found to be 0.3 weight % zirconia. This zirconia, because it is from the wear of milling media, is fine grained in size and well dispersed through the powder. After milling the powder and sintering additive, the powder was dried and sieved as typical powder by BAE Systems Advanced Ceramics PAD SiC—N processing. The material was then hot pressed using typical BAE Systems Advanced Ceramics PAD SiC—N cycle. The material after hot pressing was machined and tested. EDS/SEM analysis indicated that the zirconium carbide had been formed.

The produced material with 0.3% zirconia starting material was shown by Army Research Laboratories to have better ballistic performance than BAE Systems Advanced Ceramics PAD SiC—N in terms of $v_{50}$. The tests were performed on 0.500" tiles.

In a fourth example, 8.53 weight percent TZO powder (tetragonal $ZrO_2$ powder with no yttria addition) from Tosoh was added to PAD SiC—N powders by ball milling. These powders have a typical surface area of 14 m²/g and are sub-micron in size. The milling media was typical of what is used for PAD SiC—N. The materials were milled for slightly shorter times and using a different volatile organic solvent to maximize dispersion of the powders. The material was dried and sieved as typical PAD SiC—N powder. The powders were then hot pressed using a modified hot pressing procedure. Compared to conventional PAD SiC—N, the material was found to hot press at a lower temperature, suggesting that the zirconia reacted with the sintering aids/oxides in the system. Despite this interaction with sintering aids/oxides in the system, the zirconia was found to react to zirconium carbide by SEM/EDS analyses suggesting that zirconium carbide is the thermodynamically stable phase at these temperatures. At this concentration of zirconia addition, some zoning in the hot press body was found. Areas of increased zirconium concentration were found. Despite these microstructural inhomogeneities, ballistic performance was found to increase for DOP tests (20% improvement in performance) compared to PAD SiC—B.

In a fifth example, 8.53 weight percent TZ-3Y powder (yttria stabilized $ZrO_2$) from Tosoh was added to the PAD SiC—N powders by ball milling These powders have an average surface area of 16 m²/g and are sub-micron in size. The milling media was typical of what is used for PAD SiC—N. The material was dried and sieved as typical PAD SiC—N powder and was hot pressed using the same pressure and temperature schedule as used for the material made from 8.53 weight percent TZ-0. This hot pressed material had similar density, microstructural features, and ballistic performance as the material made from 8.53 weight percent TZ-0 material. This suggests the effect of yttria in the TZ-3Y powders is minimal. Both materials made from TZ-0 and TZ-3Y powders had a density of between 3.32 and 3.34 g/cc. This corresponds to at least 99% of theoretical density. The zirconium containing particles in these materials were visible using the backscatter mode of the SEM, see FIG. 5. They were on the order 1 to 5 microns in size and could be analyzed to be zirconium and carbon rich. Table I shows EDS spectra of a zirconium rich particle in the fracture surface of FIG. 5.

TABLE I

Figure 5:
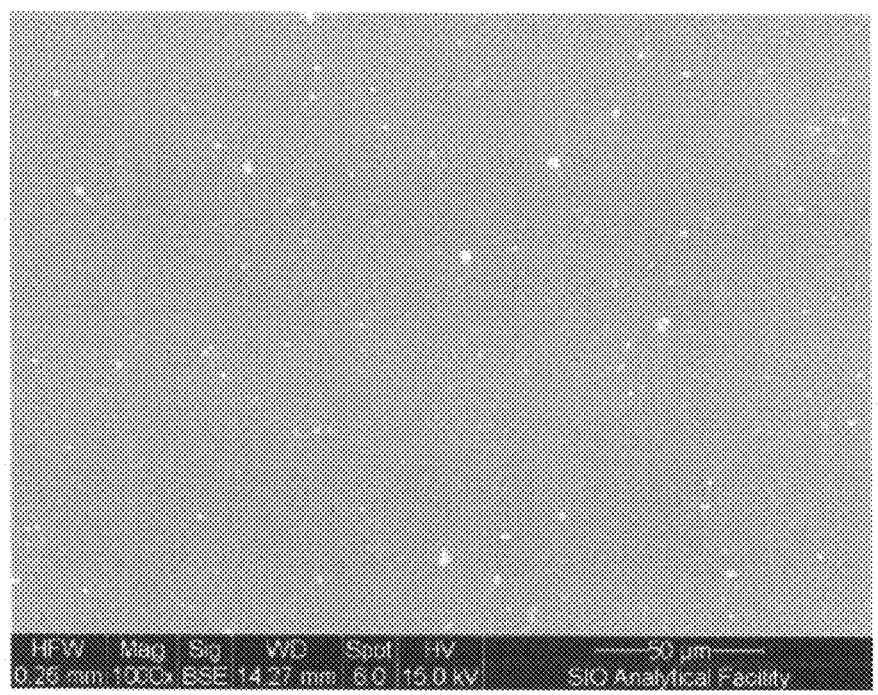
FIG. 5 comprises an SEM photomicrograph, backscatter electron image of the polished surface of a PAD SiC—N with 8.53%, by weight, $ZrO_2$ starting powder. The $ZrO_2$ in this material has reacted to zirconium carbide.

| EDS analysis of Zirconium Rich Particle in FIG. 5 | | |
|---|---|---|
| Element | Weight % | Atomic % |
| Carbon | 15.8% | 56% |
| Oxygen | 2.2% | 5.8% |
| Zirconium | 82% | 38.2% |

The results from these examples show that the benefit of adding zirconia to the starting material applies over a wide range of weight percent additives and for different size additions. Additions of 11 weight percent zirconia resulted in cracking of the ceramic after densification. The densified material had a density of between 3.38 and 3.40 g/cc, which corresponds to 9 to 10 weight percent reached ZrC or 11 weight percent unreacted $ZrO_2$. This is the upper weight percent addition that is beneficial to ballistic performance of the material. The benefit of zirconia additions at even low concentrations of 0.30%, show that even small additions of 0.1% $ZrO_2$/ZrC, are beneficial to ballistic performance.

The present invention contemplates a densified mixture of a silicon carbide ceramic material and a zirconium compound, the mixture consisting of 0.1 to about 11%, by weight, of zirconium compound before densification. The present invention also contemplates sintering the silicon carbide ceramic material with aluminum nitride as the sintering aid.

As such, an invention has been disclosed in terms of preferred embodiments thereof which fulfill each and every one of the objects of the invention as set forth hereinabove, and provide new and useful compositions for improved ceramic armor of great novelty and utility.

Of course, various changes, modifications and alterations in the teachings of the present invention may be contemplated by those skilled in the art without departing from the intended spirit and scope.

As such, it is intended that the present invention only be limited by the terms of the appended claims.

The invention claimed is:

1. A ceramic armor comprising a densified mixture of a silicon carbide ceramic material and zirconium carbide formed from a mixture comprising 0.1 to about 11%, by weight, of zirconia before densification, said silicon carbide ceramic material being sintered with aluminum nitride as a sintering aid, said armor having a density at least 99% of theoretical density.

2. The armor of claim 1, wherein said silicon carbide ceramic material comprises a hot pressed dense SiC material made from silicon carbide powder of which at least 92% is made up of alpha or beta silicon carbide.

3. The armor of claim 1, wherein said zirconia reacts to zirconium carbide during heat treatment.

4. The armor of claim 1, wherein said zirconia comprises about 0.3% to about 0.75%, by weight, of said mixture.

5. The armor of claim 3, wherein said zirconia comprises about 0.3% to about 0.75%, by weight, of said mixture.

6. The armor of claim 1, wherein said armor includes controlled defects that enhance spread of forces when a projectile strikes said armor.

7. The armor of claim 1, wherein said armor includes controlled defects that enhance spread of forces when a projectile strikes said armor.

8. The armor of claim 7, wherein said zirconia has a thermal expansion greater than a thermal expansion of silicon carbide.

9. The armor of claim 8, wherein said armor has a density greater than 3.22 g/cc.

10. The armor of claim 1, wherein said zirconia comprises about 8-9%, by weight, of said mixture.

11. A ceramic armor comprising a mixture of 89-99%, by weight, hot pressed SiC material and 0.1 to 11%, by weight, of $ZrO_2$ starting material before densification, said SiC material being sintered with MN as a sintering aid, said armor having a density at least 99% of theoretical density.

12. The armor of claim 11, wherein said $ZrO_2$ comprises about 0.3% to about 0.75%, by weight, of said mixture.

13. The armor of claim 11, wherein said armor includes controlled defects that enhance spread of forces when a projectile strikes said armor.

14. The armor of claim 11, wherein said $ZrO_2$ has a thermal expansion greater than a thermal expansion of silicon carbide.

15. The armor of claim 11, wherein said armor has a density greater than 3.22 g/cc.

16. The armor of claim 11, wherein said $ZrO_2$ comprises about 8-9%, by weight, of said mixture.

17. The armor of claim 12, wherein said armor has a density greater than 3.22 g/cc.

* * * * *

UNITED STATES PATENT AND TRADEMARK OFFICE
CERTIFICATE OF CORRECTION

| | | |
|---|---|---|
| PATENT NO. | : 7,803,732 B1 | Page 1 of 1 |
| APPLICATION NO. | : 11/430013 | |
| DATED | : September 28, 2010 | |
| INVENTOR(S) | : Ashkin et al. | |

It is certified that error appears in the above-identified patent and that said Letters Patent is hereby corrected as shown below:

col. 1 line 5 add:

STATEMENT REGARDING FEDERAL RIGHTS
This invention was made with government support under Contract No. DAAD17-02-C-0091 awarded by the U.S. Army. The government has certain rights in the invention.

Signed and Sealed this
Twenty-first Day of June, 2011

David J. Kappos
*Director of the United States Patent and Trademark Office*